(12) United States Patent
Tanaka

(10) Patent No.: US 11,303,764 B2
(45) Date of Patent: Apr. 12, 2022

(54) INKJET PRINTER

(71) Applicant: MIMAKI ENGINEERING CO., LTD., Nagano (JP)

(72) Inventor: Chisato Tanaka, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 0 days.

(21) Appl. No.: 17/123,119

(22) Filed: Dec. 16, 2020

(65) Prior Publication Data

US 2021/0195038 A1 Jun. 24, 2021

(30) Foreign Application Priority Data

Dec. 19, 2019 (JP) .............................. JP2019-228744

(51) Int. Cl.
*H04N 1/00* (2006.01)
*B41J 2/01* (2006.01)
*B41J 2/045* (2006.01)

(52) U.S. Cl.
CPC ...... *H04N 1/00206* (2013.01); *B41J 2/04586* (2013.01); *H04N 1/00037* (2013.01); *H04N 1/00039* (2013.01); *H04N 1/00076* (2013.01)

(58) Field of Classification Search
None
See application file for complete search history.

(56) References Cited

U.S. PATENT DOCUMENTS

| | | | |
|---|---|---|---|
| 2007/0011312 A1* | 1/2007 | Nakamura | H04W 24/00 709/224 |
| 2007/0037602 A1* | 2/2007 | Shimizu | H04L 1/08 455/550.1 |
| 2009/0195827 A1* | 8/2009 | Kimura | H04W 72/082 358/1.15 |
| 2017/0127384 A1* | 5/2017 | Shimada | H04W 4/80 |
| 2017/0208498 A1* | 7/2017 | Lee | H04W 76/19 |

FOREIGN PATENT DOCUMENTS

JP 2005151154 6/2005

* cited by examiner

*Primary Examiner* — Beniyam Menberu
(74) *Attorney, Agent, or Firm* — JCIPRNET

(57) ABSTRACT

An inkjet printer includes a control unit that counts the number of retries of communication between the control unit and a storage device and communication between the inkjet printer and a host computer and records the same in the storage unit. The control unit can also derive an installation environment level of the installation environment of the inkjet printer based on at least one number of retries recorded in the storage unit, and output the derived installation environment level to a display unit.

8 Claims, 5 Drawing Sheets

FIG. 2

Communication information

| Record number | Number of retries | Communication partner | Communication partner | Installation environment value | |
|---|---|---|---|---|---|
| 0001 | 3 times | Host computer | 2019/3/5 13:14 | 01 | ← 1 record |
| 0002 | Two times | Storage device | 2019/3/5 14:03 | 01 | ← 1 record |
| 0003 | 5 times | Storage device | 2019/3/6 13:45 | 01 | ← 1 record |

. . .

| 0021 | 3 times | Storage device | 2019/4/5 9:15 | 03 | ← 1 record |
| 0022 | 4 times | Host computer | 2019/4/5 12:21 | 03 | ← 1 record |
| 0023 | 5 times | Storage device | 2019/4/6 15:56 | 03 | ← 1 record |

Table

| Average value of number of retries (H) | Installation environment level |
|---|---|
| $0 \leqq H < 1$ | 4 |
| $1 \leqq H < 3$ | 3 |
| $3 \leqq H < 4$ | 2 |
| $4 \leqq H \leqq 5$ | 1 |

INKJET PRINTER

CROSS REFERENCE TO RELATED APPLICATIONS

This application claims the priority benefit of Japanese Patent Application No. 2019-228744, filed on Dec. 19, 2019. The entirety of the above-mentioned patent application is hereby incorporated by reference herein and made a part of this specification.

TECHNICAL FIELD

The present disclosure relates to an inkjet printer.

DESCRIPTION OF THE BACKGROUND ART

There is known a communication device that performs a retry, a plurality of times, to attempt communication again when communication inside the device or communication with another device is not satisfactory. Such a communication device usually detects an abnormality such as a communication error when the number of retries reaches a certain number of times (e.g., Japanese Unexamined Patent Publication No. 2005-151154).

Since the susceptibility to the occurrence of communication failure described above depends on the presence or absence of influence of noise or the like, it depends on the installation environment of the communication device. As the conventional communication device only detects an abnormality such as a communication error when the communication is not satisfactory even if the number of retries reaches a certain number of times, it is not possible to know the degree of goodness or badness of the installation environment.

The present disclosure has been contrived in view of the above points, and provides an inkjet printer in which the degree of goodness or badness of the installation environment can be determined.

SUMMARY

The inkjet printer according to the present disclosure relates to an inkjet printer (e.g., inkjet printer 100) that communicates for a process and performs a retry when the communication is not satisfactory, the inkjet printer including, an acquiring unit (e.g., control unit 150 that counts number of retries) that acquires a parameter for evaluating the quality of the communication for each process and records the parameter in a storage unit; and a deriving unit (e.g., control unit 150 that derives installation environment level) that derives a level of goodness or badness (e.g., installation environment level) of an installation environment of the inkjet printer as one of two or more levels defined in advance based on at least one parameter recorded in the storage unit (see e.g., FIG. 4).

BRIEF DESCRIPTION OF THE DRAWINGS

FIG. 2 is a view showing one example of communication information.

FIG. 4 is a view showing a configuration example of a table referenced in the display process.

DETAILED DESCRIPTION OF EMBODIMENTS

According to the configuration described above, since the level of goodness or badness of the installation environment of the inkjet printer is derived at two or more levels, the degree of goodness or badness of the installation environment is determined.

The acquiring unit may count number of retries of the communication for each process and record the counted number of retries in the storage unit; and the deriving unit may compare at least one number of retries recorded in the storage unit with one or more reference values, and based on the result, select one of two or more levels defined in advance as the level of goodness or badness of the installation environment.

According to the above configuration, the degree of goodness or badness of the installation environment is determined.

The acquiring unit may acquire, for each process, time taken from the end of the first communication for the process until the end of the successful or last communication for the process and record the time in the storage unit; and the deriving unit may compare at least one time recorded in the storage with one or more reference values, and based on the result, select one of two or more levels defined in advance as the level of goodness or badness of the installation environment.

According to the above configuration, the degree of goodness or badness of the installation environment is determined.

The acquiring unit may record the parameter for each of a plurality of installation environments of the inkjet printer;

the deriving unit may derive the level of goodness or badness for each of the plurality of installation environments; and the inkjet printer may further include an output unit that outputs the level of goodness or badness derived by the deriving unit for each of the plurality of installation environments in a comparable manner.

According to the above configuration, whether or not the installation environment has improved can be notified.

The plurality of installation environments may include the current installation environment and the previous installation environment.

According to the above configuration, whether or not the current installation environment has improved as compared with the previous installation environment can be determined.

According to the present disclosure, an inkjet printer in which the degree of goodness or badness of the installation environment can be known can be provided.

Hereinafter, an embodiment in which the present disclosure is applied to an inkjet printer will be described.

(Configuration of Inkjet Printer 10)

Figure 1:
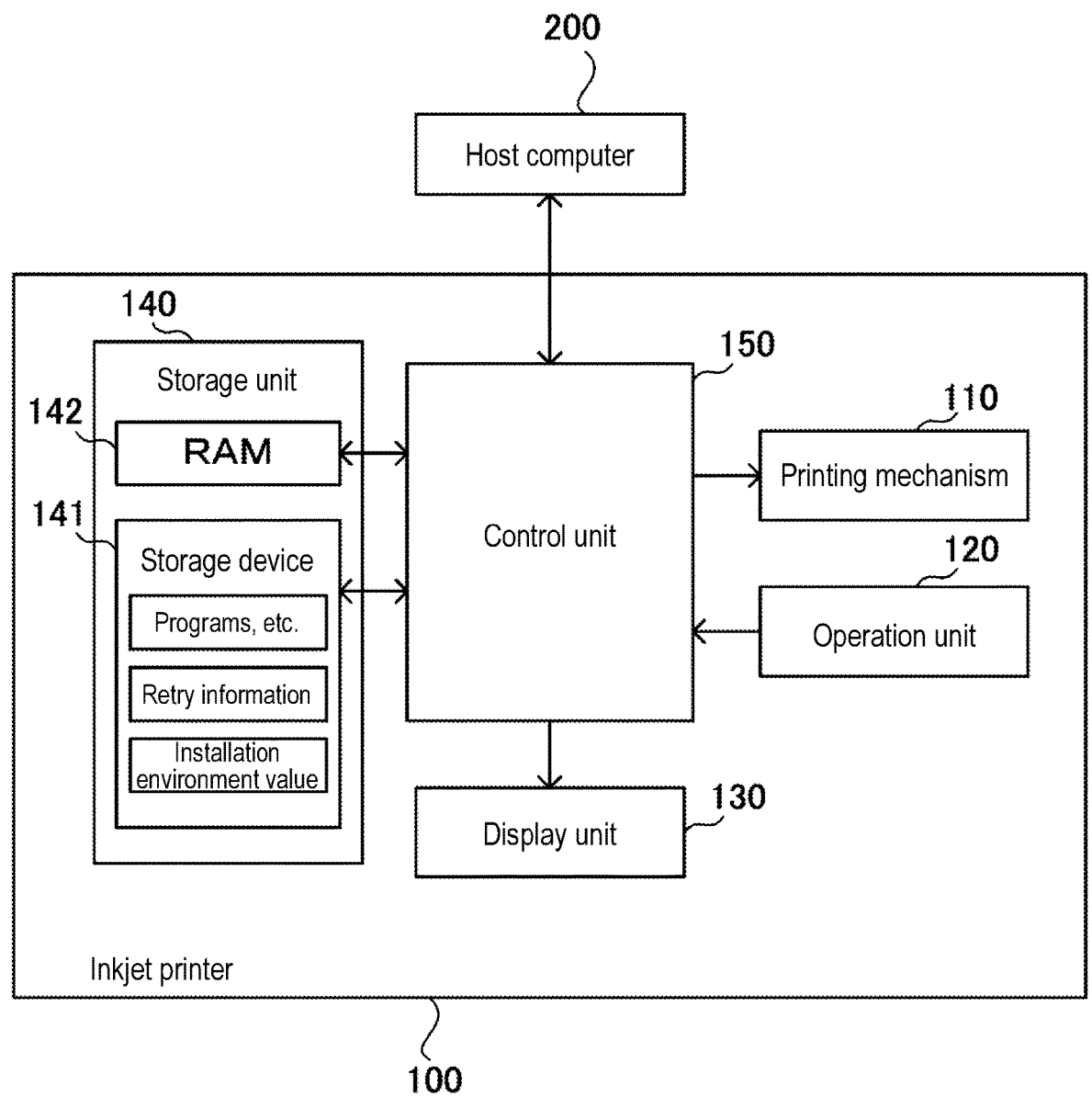
FIG. 1 is a view showing a schematic configuration of an inkjet printer according to one embodiment of the present disclosure.

As shown in FIG. 1, an inkjet printer 100 according to the embodiment of the present disclosure includes a printing mechanism 110, an operation unit 120, a display unit 130, a storage unit 140, and a control unit 150. The inkjet printer 100 having such a configuration can print an image represented by image data on a medium such as paper based on the image data provided from a host computer 200.

The printing mechanism 110 operates to print an image on the medium under the control of the control unit 150. The printing mechanism 110 may be formed by a known mechanism. The printing mechanism 110 includes, for example, an inkjet head that ejects ink for forming an image by an inkjet method, and an ink supply mechanism that supplies ink in an ink bottle to the inkjet head. Furthermore, the printing mechanism 110 includes a head moving mechanism that moves the inkjet head relative to the medium along the main scanning direction and the sub scanning direction.

The operation unit 120 includes an operation switch and the like, and receives an operation from a user (including an operator) or a serviceman. A serviceman is a person who carries out maintenance and inspection of the inkjet printer 100.

The display unit 130 includes a display such as a liquid crystal display device, and displays various images under the control of the control unit 150. The display unit 130 displays, for example, an image constituting an operation screen when receiving an operation on the operation unit 120.

The storage unit 140 includes a RAM (Random Access Memory) 142 that functions as a main memory of the control unit 150. The storage unit 140 further includes a writable and non-volatile storage device 141 such as an HDD (Hard Disk Drive), an SSD (Solid State Drive), or a flash memory.

The storage device 141 stores a program executed by the control unit 150. The storage device 141 also stores various parameters and various data (including communication information and installation environment values described later) used by the control unit 150.

The control unit 150 controls the entire operation of the inkjet printer 100. Here, the control unit 150 is composed by a CPU (Central Processing Unit). The control unit 150 may be configured to include a CPU and a DSP (Digital Signal Processor) or the like dedicated to performing specific processing such as image processing when printing an image.

The control unit 150 controls the printing mechanism 110 to print an image on the medium by executing a program recorded in the storage device 141. In the control, the control unit 150 communicates with the storage device 141 or the host computer 200. For example, the control unit 150 communicates with the storage device 141 to read/write data (data necessary for printing control) with respect to the storage device 141. For example, the control unit 150 communicates with the host computer 200 via a predetermined communication module or the like (not shown) to execute a loopback process or receive image data to use for printing. One transmission of data to the host computer 200 required for the inkjet printer 100 to execute a process or job or one reception from the host computer 200, for example, one reception of image data from the host computer 200 required for the inkjet printer 100 to perform a print job corresponds to one communication.

The communication may end unsuccessfully due to external factors such as noise. When the communication fails, the control unit 150 performs a retry to attempt to reacquire all or part of the failed communication. The retry method may be performed by a known method. The retry is repeatedly performed until the communication is successful or the number of retries reaches a predetermined number of times. Here, the predetermined number of times is five times regardless of the communication partner. The susceptibility to the occurrence of communication failure varies depending on the installation environment of the inkjet printer 100. The susceptibility to the occurrence of noise and/or the susceptibility to the influence of noise may vary depending on the installation environment. The installation environment includes, other than the installing position of the inkjet printer 100 (e.g., the distance with a device which is a noise source that generates high frequencies), types of various cables connected to the inkjet printer 100.

If communication is not satisfactory even when the number of retries reaches the predetermined number of times, the control unit 150 executes a process for troubleshooting. For example, the control unit 150 displays an image urging replacement of various cables such as the interface cable, restart of the inkjet printer 100, and the like on the display unit 130.

(Characteristic Configuration and Operation of Inkjet Printer 100)
(Communication Information and Installation Environment Value)

As described above, the storage device 141 stores the communication information and the installation environment value.

The installation environment value is a numerical value that is updated every time the installation environment of the inkjet printer 100 changes. The initial value of the installation environment value is "01", and the installation environment value increases by 1 each time the installation environment changes. The change in the installation environment is input by the user or the serviceman through the operation unit 120. For example, the user or the serviceman inputs that the installation environment has been changed through the operation unit 120 (e.g., selects image of "change in installation environment" in the menu screen). The control unit 150 increases the set environment value stored in the storage device 141 by 1 based on the input.

As shown in FIG. 2, communication information includes a set of records sequentially recorded for the entire one or more communications performed until the communication is successful to execute a certain process or job or until the number of retries reaches a predetermined number of times. One record includes the record number for identifying the record, the "number of retries" which is the number of times the retry has been performed, the opponent of communication ("communication partner"), and the "date and time" when communication has been made (e.g., date and time when the first communication has been performed), and the "installation environment value", which are stored in the storage device 141 in association with each other.

The control unit 150 counts the number of times the retry has been performed for each process or job described above, and records the counted number of times as the number of retries in the storage device 141 of the storage unit 140. Here, the recorded number of retries is the number of retries performed regardless of the success or failure of communication (i.e., the number of retries can take any value from 0 to 5). The control unit 150 generates a record number when recording the number of retries. Thereafter, the control unit 150 associates the generated record number, the number of retries, the communication partner of the communication in which retry is performed, the date and time when the retry is performed, and the installation environment value stored in the storage device 141 at the time of the retry, and records such information in the storage device 141 as one record of communication information. The communication information is composed of the records sequentially recorded in such a manner. Note that the communication information may be acquired only for the process in which the retry is performed.

(Display of Installation Environment Level)

The inkjet printer 100 can display an image showing the installation environment level based on the number of retries of the communication information. The installation environment level indicates the goodness or badness (satisfactory degree, etc.) of the set environment of the inkjet printer 100 in a plurality of stages (here, 5 stages). Here, the installation environment level is set so that the larger the value of the installation environment level, the smaller the number of retries. If the number of retries is large, this means that there are many communication failures (which is greatly affected by noise and the like), and the installation environment of the inkjet printer 100 is poor. Therefore, the higher the installation environment level, the better the installation environment (retry is less likely to occur), and the lower the installation environment level, the worse the installation environment (retry is likely to occur).

The installation environment level is displayed, for example, by the following procedure. The user or serviceman inputs an instruction to display the installation environment level through the operation unit 120. Specifically, the user or the serviceman selects the image of "installation environment level display" in the menu screen. In response to the input of the instruction, the control unit 150 displays a display screen including the image of the installation environment level on the display unit 130.

Figure 3:
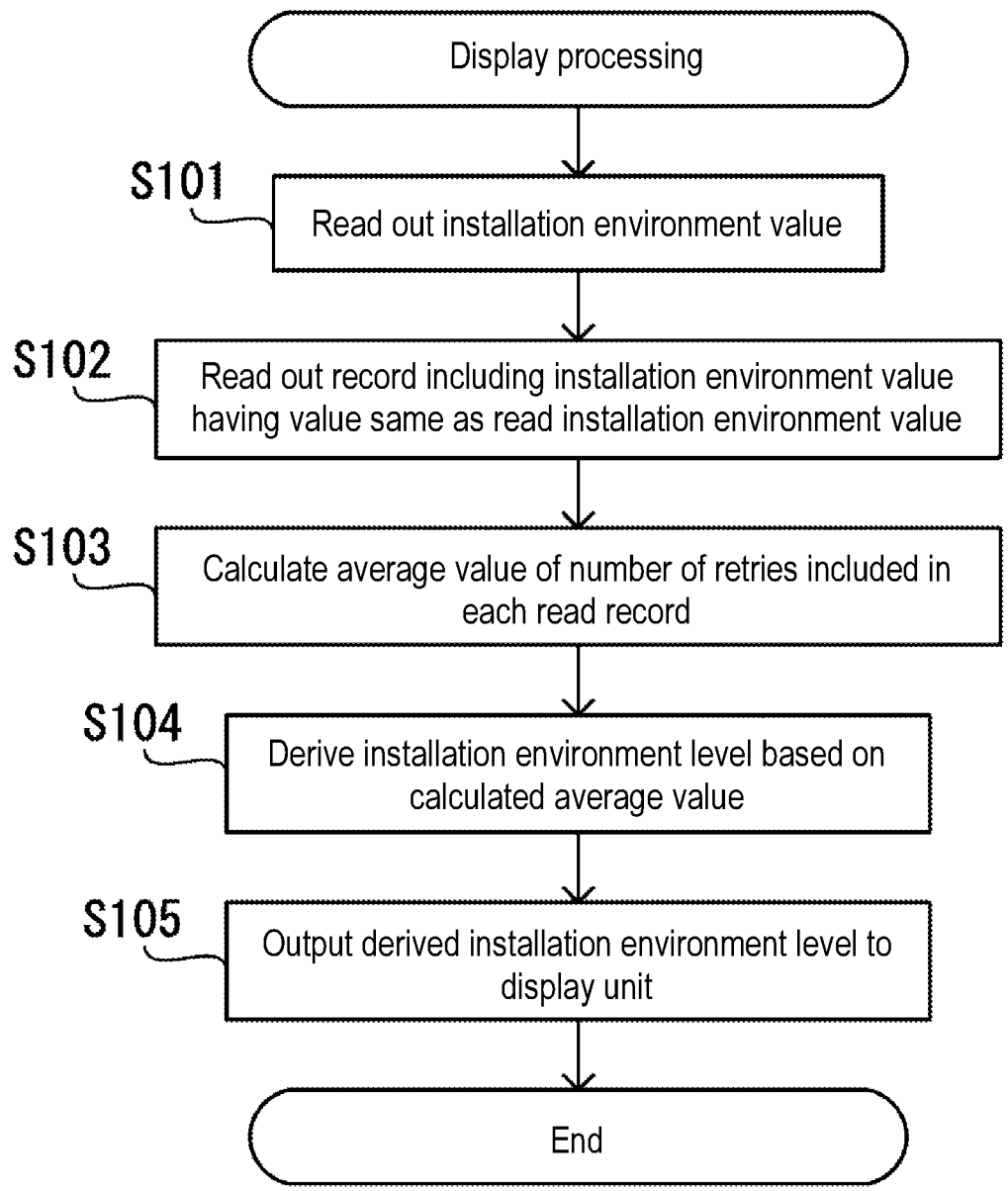
FIG. 3 is a flowchart of a display process.

The control unit 150 executes the display process illustrated in FIG. 3 when displaying the installation environment level. The control unit 150 first reads out the installation environment value from the storage device 141 (step S101), and reads out a record including the installation environment value having the same value as the read installation environment value from the communication information stored in the storage device 141 (step S102).

Thereafter, the control unit 150 calculates an average value H of the number of retries based on the number of retries included in each read record (step S103), and derives the installation environment level based on the calculated average value H (step S104).

In step S104, the control unit 150 compares the average value H with one or more reference values, and selects the installation environment level based on the result thereof to derive the installation environment level. For example, the control unit 150 derives the installation environment level by referencing to the table shown in FIG. 4. In the table shown in FIG. 4, one of the installation environment levels "1" to "4" is assigned to each numerical range of the average value H. In FIG. 4, "4" is assigned as the installation environment level when the average value H is greater than or equal to 0 and less than 1, and "3" is assigned as the installation environment level when the average value H is greater than or equal to 1 and less than 3. Furthermore, "2" is assigned as the installation environment level when the average value H is greater than or equal to 3 and less than 4, and "1" is assigned as the installation environment level when the average value H is greater than or equal to 4 and less than or equal to 5. Based on the average value H calculated above, the control unit 150 refers to the table in FIG. 4 and derives the value of the installation environment level assigned to the numerical range in which the average value H falls as the current installation environment level. For example, if the average value H is 1.4, the set environment level is "3".

According to the assignment as shown in FIG. 4, if the average value of the number of retries is large, the installation environment level is low, and if the average value of the number of retries is small, the installation environment level is high. If the average value of the number of retries is large, noise or the like is likely to occur, and the installation environment is bad. Therefore, the higher the installation environment level, the better the installation environment (retry is less likely to occur), and the lower the installation environment level, the worse the installation environment (retry is likely to occur).

Figure 5:
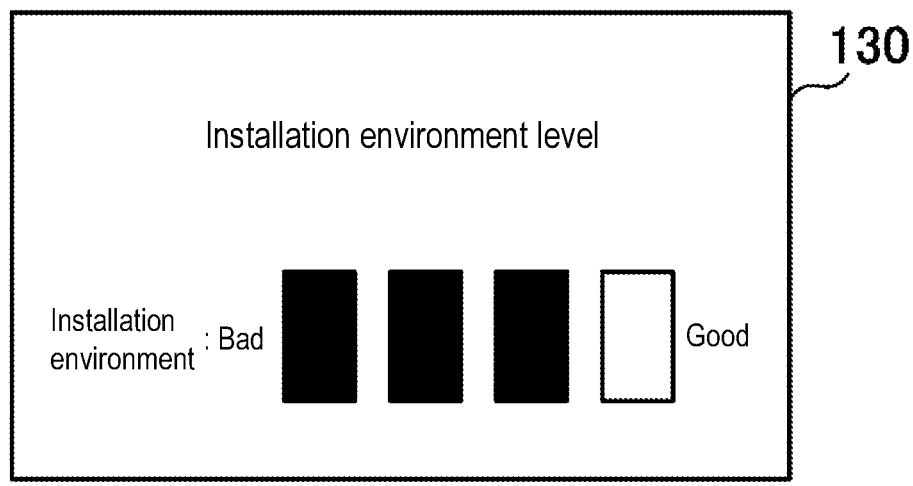
FIG. 5 is a view of a display screen of an installation environment level.

After step S104, the control unit 150 displays the installation environment level derived in step S104 on the display unit 130 (step S105). For example, as shown in FIG. 5, the installation environment level is displayed by the presence or absence of the number of lightings of four blocks (lighting is left-justified. lighting is shown in black in the figure), that is, the lighting of each of the images of the four blocks.

(Effects, etc.)

As described above, in the present embodiment, the inkjet printer 100 displays (notifies) the installation environment level in levels of four stages, and thus can effectively notify the user or the serviceman of the degree of goodness (or badness) of the current installation environment of the inkjet printer 100.

Before changing the installation environment of the inkjet printer 100, the user or the serviceman displays and records the installation environment level before the change in the inkjet printer 100, and after a while after the installation environment is changed, displays the installation environment after the change in the inkjet printer 100. As a result, the user or the serviceman can compare the installation environment level before and after the change of the installation environment, and can confirm whether the change of the installation environment has led to the improvement of the installation environment.

MODIFIED EXAMPLES

The present disclosure is not limited to the embodiment described above. Modified examples of the above embodiment are illustrated below.

First Modified Example

Figure 6:
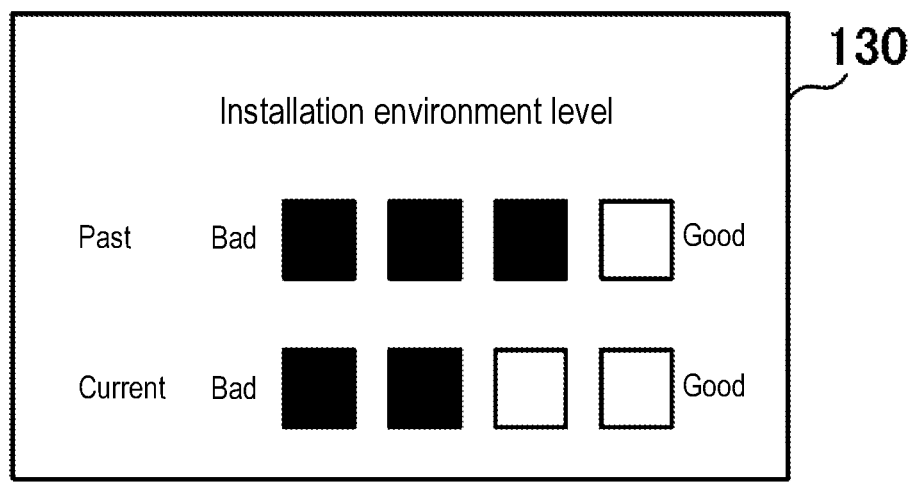
FIG. 6 is a view of a display screen of another example of the installation environment level.

When displaying the installation environment level on the display unit 130, for example, as shown in FIG. 6, the control unit 150 may display the installation environment level in the previous installation environment in addition to the installation environment level in the current installation environment.

For example, in step S102, the control unit 150 reads out a record including the installation environment value having the same value as the installation environment value read in step S101 as a first record from the communication information stored in the storage device 141. Furthermore, in step S102, the control unit 150 reads out a record including the same installation environment value as the value obtained by subtracting 1 from the installation environment value read in step S101 as a second record from the communication information stored in the storage device 141.

In step S103, the control unit 150 calculates an average value H1 of the number of retries based on the number of retries included in each of the first records, and calculates an average value H2 of the number of retries based on the number of retries included in each of the second records. In step S104, the control unit 150 derives the installation environment level as a first installation environment level based on the average value H1, and derives the installation environment level as a second installation environment level based on the average value H2.

In step S105, the control unit 150 displays the first installation environment level and the second installation environment level on the display unit 130. For example, as shown in FIG. 6, the control unit 150 displays each of the current installation environment level and the past installation environment level (the installation environment one before the installation environment is changed) by each of the images indicated by the presence or absence of lighting of each of the images of the four blocks.

As shown in FIG. 6, the control unit 150 displays the first installation environment level (current) and the second installation environment level (past) on the display unit 130 in a comparable manner, whereby the user or the serviceman can compare the installation environment level before and after the change of the installation environment, and can easily confirm whether the change of the installation environment has led to the improvement of the installation environment.

The inkjet printer 100 may display the installation environment level in the current installation environment and the installation environment level in the past installation environment. The past installation environment may be the installation environment of at least one or a plurality of installation environments of the past installation environments, other than the previous installation environment. That is, the control unit 150 may display the installation environment level of each of the plurality of past installation environments together with or in place of the current installation environment level.

Each time the installation environment value is changed, the control unit 150 may read out a record including the installation environment value before the change from the communication information stored in the storage device 141, and perform the same processing as in steps S103 and S104 to derive the installation environment level. In this case, the control unit 150 may record the derived installation environment level in the storage device 141 as the past installation environment level displayed above.

Second Modified Example

The installation environment level may be displayed for each process or job without instructions from the user or serviceman.

For example, the control unit 150 counts the number of times the retry has been performed for each process or job, and records the counted number of times as the number of retries in the storage device 141 of the storage unit 140. Thereafter, the control unit 150 reads out the number of retries recorded in the storage unit 14, and derives the installation environment level based thereon.

For example, the control unit 150 derives the installation environment level in the same manner as in step S104 other than that the number of retries described above is used in place of the average value H.

Third Modified Example

The number of retries recorded in the storage device 141 may be the number of retries for all the retries regardless of the success or failure of communication as described above (i.e., the predetermined number of times is also included), or may be the number of retries for the retries when communication is successful. In the latter case, the level of good or bad of the installation environment when not going to troubleshoot is effectively notified.

Fourth Modified Example

The predetermined number of times, which is the number of times the control unit 150 can retry, may be changed according to the communication partner. For example, when the communication partner is the storage device 141, the predetermined number of times may be set to 3 times, and when the communication partner is the host computer 200, the predetermined number of times may be set to 6 times. In this case, it is preferable to calculate the average of the number of retries for each communication partner and derive the installation environment level for each communication partner. This makes it possible to notify the degree of goodness or badness of the installation environment for each communication partner.

Fifth Modified Example

An upper limit may not be set for the number of retries. For example, instead of repeatedly performing the retry until the communication is successful or the number of retries reaches a predetermined number of times, the retry may be repeatedly performed until the communication is successful or until a time from the start of the communication to the start of the latest retry exceeds a predetermined time.

Sixth Modified Example

Instead of deriving the installation environment level based on the number of retries, the installation environment level may be derived based on other parameters that evaluate the quality of communication.

For example, as such a parameter, a time (hereinafter referred to as communication time) taken from the end of the first communication for each process or job until the end of the successful communication (last communication when attempt of retry is interrupted before communication is successful due to reasons such as the number of retries reaching the upper limit) may be used.

For example, in a case where the inkjet printer 100 receives the image data required to perform a print job from the host computer 200, the time from when the inkjet printer 100 first receives the image data until receiving image data without defects that can be used for execution of the print job may be used as the communication time. In this case, if there is no defect in the first image data, the communication time is 0.

In a case where the installation environment level is derived based on the average value of the communication time (when the present modified example is combined with the embodiment described above) or the communication time itself (when the second modified example and the present modified example are combined), the average value of the communication time or the communication time is compared with one or more predetermined times, where the predetermined time may be determined according to the amount of communication, for example, in proportion to the size of data to be communicated.

As other parameters that evaluate the quality of communication, the frequency or total amount of packet loss in a single communication, or the frequency or total amount of packet loss that occurred before communication for a process or job is successful or is interrupted may be used.

Seventh Modified Example

The present disclosure can be applied to all communication devices capable of performing communication and performing retry when the communication is not satisfactory. The communication may be communication within the communication device, for example, communication between a control unit including one or more processors such as a CPU disposed in the communication device, and a storage device, various sensors, and the like disposed in the communication device. The communication may be communication between a predetermined device in the communication device (e.g., a control unit including one or more processors such as a CPU disposed in the communication device) and a device outside the communication device. Examples of the communication device include various printers such as laser printers, cutting plotters, laser printers, various robots, and various computers.

Eighth Modified Example

The installation environment level may be two or more levels, especially three or more levels. The installation environment level may be derived based on the maximum value of the number of retries in addition to the average value of the number of retries. The installation environment level can be derived by calculation in addition to being derived by referring to the table. The installation environment level merely needs to be the level of goodness or badness of the installation environment, and may indicate the degree of goodness of the installation environment (e.g., the better the higher the level), or may indicate the degree of badness of the installation environment (e.g., the worse the higher the level).

Ninth Modified Example

The control unit 150 merely needs to be able to output the installation environment level, and may notify the installation environment level by voice. The control unit 150 may transmit the installation environment level to a device external to the communication device such as an inkjet printer. According to this transmission, it can be said that the installation environment level has been notified to the external device. The external device may notify the installation environment level. The control unit 150 may display the installation environment level numerically. According to the output of the installation environment level, the user or the serviceman can allow the external device, and the like to know the installation environment level. Then, the level of goodness or badness of the installation environment can be notified in some way by the output of the installation environment level.

What is claimed is:

1. An inkjet printer that communicates for a process and performs a retry when the communication is not satisfactory, the inkjet printer comprising:
a processor, configured to:
acquire a parameter for evaluating a quality of the communication for each process and records the parameter in a storage unit; and
derive a level of goodness or badness of an installation environment of the inkjet printer as one of two or more levels defined in advance based on at least one parameter recorded in the storage unit,
wherein the processor acquires, for each process, time taken from the end of a first communication for the process until the end of a successful or last communication for the process and records the time in the storage unit, and
the processor compares at least one time recorded in the storage with one or more reference values, and based on a result of the comparison, selects one of two or more levels defined in advance as the level of goodness or badness of the installation environment.

2. The inkjet printer according to claim 1, wherein
the processor counts number of retries of the communication for each process and records the counted number of retries in the storage unit; and
the processor compares at least one number of retries recorded in the storage unit with one or more reference values, and based on the result, selects one of two or more levels defined in advance as the level of goodness or badness of the installation environment.

3. The inkjet printer according to claim 2, wherein
the processor records the parameter for each of a plurality of installation environments of the inkjet printer;
the processor derives the level of goodness or badness for each of the plurality of installation environments; and
the inkjet printer further includes a display screen that outputs the level of goodness or badness derived by the processor for each of the plurality of installation environments in a comparable manner.

4. The inkjet printer according to claim 3, wherein the plurality of installation environments include a current installation environment and a previous installation environment.

5. The inkjet printer according to claim 2, wherein the plurality of installation environments include a current installation environment and a previous installation environment.

6. The inkjet printer according to claim 1, wherein
the processor records the parameter for each of a plurality of installation environments of the inkjet printer;
the processor derives the level of goodness or badness for each of the plurality of installation environments; and
the inkjet printer further includes a display screen that outputs the level of goodness or badness derived by the processor for each of the plurality of installation environments in a comparable manner.

7. The inkjet printer according to claim 6, wherein the plurality of installation environments include a current installation environment and a previous installation environment.

8. The inkjet printer according to claim 1, wherein the plurality of installation environments include a current installation environment and a previous installation environment.

* * * * *